Oct. 25, 1960  C. W. SKARSTROM  2,957,709
SEALING MEANS FOR RELATIVELY ROTATABLE MEMBERS
Filed March 1, 1946  2 Sheets-Sheet 1

INVENTOR.
Charles W. Skarstrom
BY
ATTORNEY

Oct. 25, 1960

C. W. SKARSTROM 2,957,709

SEALING MEANS FOR RELATIVELY ROTATABLE MEMBERS

Filed March 1, 1946

INVENTOR.
Charles W. Skarstrom
BY
ATTORNEY

United States Patent Office 2,957,709
Patented Oct. 25, 1960

2,957,709

SEALING MEANS FOR RELATIVELY ROTATABLE MEMBERS

Charles W. Skarstrom, Pearl River, N.Y., assignor to the United States of America as represented by the United States Atomic Energy Commission Filed Mar. 1, 1946, Ser. No. 651,288

4 Claims. (Cl. 285—11)

The present invention relates to sealing means and more particularly to means for maintaining a seal between a pair of relatively rotatable members. The invention is herein shown and described in association with a high speed centrifuge device, the sealing means being utilized in connection with the rotating shafts mounting the centrifuge rotor or bowl, but it will be apparent that the invention is of broad application and is in no sense limited to such specific application.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations, and improvements herein shown and described.

The accompanying drawings, referred to herein and constituting a part hereof, illustrate one embodiment of the invention, and together with the description, serve to explain the principles of the invention.

Figure 1:
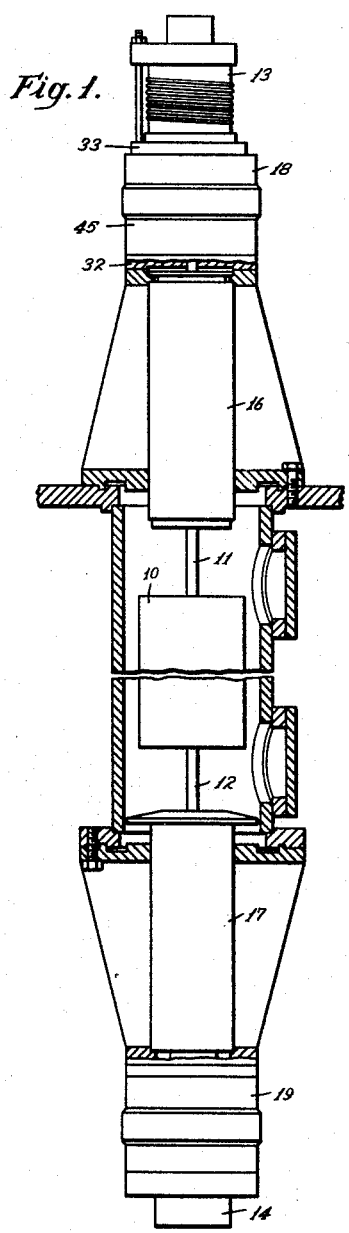
Fig. 1 is a view partly in elevation and partly in cross section of a centrifuge embodying the sealing means of the present invention; and, Fig. 2 is a partial longitudinal sectional view on an enlarged scale of the sealing means of the present invention, and Figure 3.

It is an object of the present invention to provide a positive and efficient seal between a pair of relatively rotatable members. A further object of the invention is the provision of such a seal which allows for relative radial movement of said members. The invention is particularly adaptable to the provision of an effective seal between a rotating shaft and a stationary member surrounding the shaft and serves to prevent undesired flow of fluid between such a shaft and member. Still another object of the invention is to provide a seal about a hollow rotatable shaft through which a fluid is channelled and communicates with the outside of the shaft through a surrounding stationary member, the seal serving to prevent escape of fluid between the shaft and stationary member to the surrounding area. The invention further provides a sealing means for an assembly such as that mentioned in the last object effective to recapture valuable fluids flowing through the shaft which may escape from the area of fluid intercommunication between the shaft and stationary member. A further object of the invention is to provide a sealing means between a hollow rotatable shaft carrying two or more separated fluid streams and a stationary member with which the streams have communication designed to prevent intercommunication between the streams and between either stream and the area surrounding the members.

The invention is herein shown and described as utilized in connection with a high speed centrifuge capable of speeds of the order of 30,000 revolutions per minute such as may be used, for example, for the separation of gaseous elements or components which differ from each other but slightly in atomic or molecular weight. Such materials may be of a corrosive nature and it becomes extremely important to prevent their escape from their proper paths through the machine to contaminate the lubricant used or the atmosphere of the surrounding area. The materials centrifuged may also be of a valuable nature so that it is further important to prevent their escape. The centrifuge in connection with which the invention is herein illustratively described and shown is of the countercurrent flow type involving the flow of gaseous material through the centrifuge bowl and its mounting shafts in two distinct oppositely directed streams, and it is necessary to prevent unintentional intermingling of these streams in order to keep the separative efficiency of the device at the highest possible point.

Sealing means in accordance with the present invention are positioned along upper and lower hollow shafts which rotatably mount the centrifuge bowl or rotor at places where the material flowing through the centrifuge enters and leaves the shafts. The shafts at these places are each provided with an impeller member through which material being processed is pumped from one passage within the hollow shaft into a communicating port in the stationary member surrounding the shaft and thus out of the centrifuge. The impeller member extends radially outwardly from the shaft into an annular space in the surrounding stationary member, and is provided with an elongated hub extending axially along the shaft. The impeller hub is provided with apertures through which material to be processed may flow from adjacent ports in the stationary member into a second passage in the hollow shaft. A pair of elongated sleeves are positioned between the stationary member and the impeller hub, one at either side axially of the outwardly radially extending impeller, and a plurality of shorter sleeves are positioned within and spaced apart along each elongated sleeve. A plurality of cylindrical sealing members are positioned around the impeller hub and have integral outwardly radially extending flanges with surfaces lying in a plane normal to the axis of the centrifuge shaft to abut similarly disposed surfaces on respective ones of the shorter sleeves. Resilient means are provided for biasing the sleeve and flange surfaces together, forming a plurality of seals axially spaced along the centrifuge shaft.

It will be understood that the foregoing general description and the following detailed description as well are exemplary and explanatory of the invention but are not restrictive thereof.

Referring now in detail to the illustrative embodiment of the invention shown by way of example in the accompanying drawings, and referring first to Fig. 1, a high speed centrifuge for separating mixed gaseous material into its lighter and heavier component parts may comprise a vertically disposed rotor or bowl 10 mounted for free rotation by means of upper and lower shafts 11 and 12 respectively. The rotor 10 is driven by means of an electric motor 13 at the top of the assembly connected to the upper shaft 11 and the forces of axial thrust exerted by and upon the shafts and rotor are taken by a thrust bearing at the bottom of lower shaft 12 indicated generally by the numeral 14. Damping means for damping out excessive vibration in the upper and lower shafts are preferably provided and are indicated generally by the numerals 16 and 17 respectively.

The sealing means of the present invention are located at position 18 about the upper shaft 11 and at position 19 about the lower shaft 12. The sealing means at 18 and 19 are substantially identical so that a description of the upper shaft sealing means alone will be sufficient, it being understood that an equivalent seal is also provided about the lower shaft.

Figure 2:
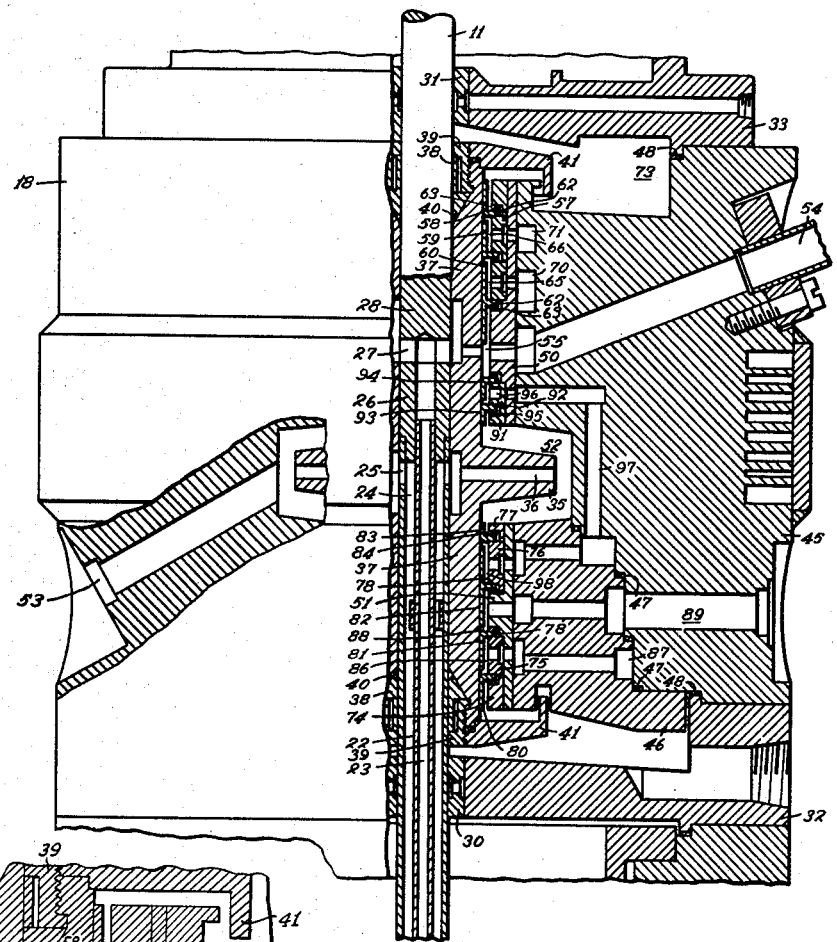
Figure 3:
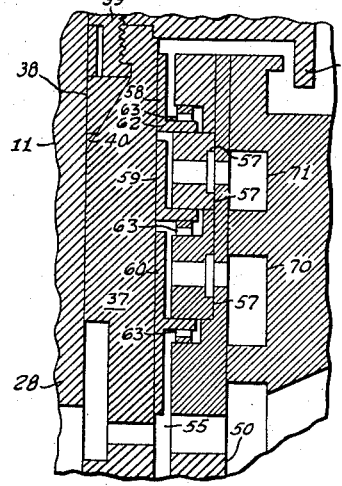
Figure 3 is a partial longitudinal sectional view on an enlarged scale of the upper sealing means of Figure 2.

As shown in Fig. 2, the shaft 11 is divided by means of an inner tube 22 into a pair of passages 23 and 24 through which the gas to be processed flows in oppositely directed streams. A more complete description of the countercurrent type of flow through a centrifuge of similar construction may be found in the copending application of Karl P. Cohen, Serial No. 575,533 filed January 31, 1945, now matured into U.S. Patent 2,936,-110, issued May 10, 1960. In the present showing, the process gas flows upwardly through the outer, annular passage 24, having passed through the bowl 10, and out ports 25 in the shaft, the passage 24 being blocked at 26 above the ports. A backward flow of process gas toward the bowl 10 enters the inner, cylindrical passage 23 through ports 27, and the passage is blocked at 28 above the ports. The shaft 11 is journalled in bearings 30 and 31 provided in stationary portions 32 and 33 respectively of the centrifuge framework.

A centrifugal pump is provided in association with shaft 11 at ports 25 to move the forward flow of process gas. As shown the pump comprises an impeller 35 having passages 36 for conveying gas from ports 25, and the pump has integral cylindrical hub portions 37 extending to each side and surrounding shaft 11. The impeller is securely held with respect to the shaft for rotation therewith by means of assemblies at either end of the portions 37 including frusto-conically shaped clamping collets 38 engaging the cooperatingly formed ends of portions 37 and held by collars 39 screwed in the ends of portions 37. Aluminum gaskets 40 are compressed between collets 38, cylindrical hub portions 37 of the impeller and the shaft 11, and these gaskets may be formed originally of rectangular cross-section and compressed to the form shown in order to provide an effective seal against flow of process gas beyond the ends of portions 37. Oil throwers 41 are arranged at either end of the impeller assembly to prevent lubricating oil for bearings 30 and 31 from entering the sealing area for the shaft.

Sealing means in accordance with the present invention are provided between the impeller hub portions 37 and stationary portions 45 and 46 of the centrifuge, which form a jacket about the shaft and are constructed separately for ease in assembling and disassembling the seal. Suitable sealing gaskets 47 may be positioned between members 45 and 46, and other gaskets 48 between member 45 and adjoining stationary portions of the centrifuge.

An elongated sleeve member 50 is provided above impeller 35 and a similar sleeve member 51 is provided below the impeller, and these members are positioned against the stationary members 45 and 46 and are secured in position by being pressed or shrink fitted in place. Process gas leaving impeller 35 through passages 36 flows into annular space 52 provided by the formation of jacket members 45 and 46, and from space 52 outwardly of the centrifuge through a passage 53. Process gas may enter the centrifuge through a passage 54 to an annular space 55 and thence into shaft 11 through ports 27. Means are supported by sleeve members 50 and 51 for inhibiting the flow of gas from spaces 52 and 55 either toward the adjacent gas stream or outwardly of the machine along cylindrical impeller portions 37.

As embodied, there are provided three inner sleeves or blocks 57 toward the upper end of sleeve 50 and shrink fitted therein, and within sleeve 57 are positioned three sealing members 58, 59 and 60 each having cylindrical portions having a relatively close fit about the portion 37 of impeller 35. Each of the sealing rings 58, 59 and 60 has an integral outwardly radially extending flange portion 62 extending into annular spaces provided by the sleeve members 57 and outer sleeve member 50 in relation to each other, and one face of each such flange is held against an adjacent surface of a sleeve 57 by means of a ring spring 63, which engages the other face of the flange 62 and an adjacent surface of a sleeve 57 or sleeve 50. The sealing rings 58, 59 and 60 are thus arranged to block the flow of process gas from space 55 upwardly along the impeller portion 37, and are capable of radial movement to follow slight vibration of shaft 11 while still maintaining the seal. The flanges 62 for the sealing rings 58 and 59 are positioned at the ends of the rings while the flange for ring 60 is centrally located, this ring being somewhat longer than 58 and 59. The sealing action of each type of ring is the same, the ring 60 simply providing a somewhat greater sealing engagement with member 37.

The sealing rings 58, 59 and 60 are axially spaced apart along member 37 and are likewise spaced from sleeve members 50 or 57. There are thus provided small annular spaces 65 and 66, the former communicating with the outside of the centrifuge through apertures in sleeves 50 and one sleeve 57 and passage 70 through jacket portion 45, and the latter similarly communicating with the outside through a passage 71. In order to completely prohibit the uncontrolled escape of process gas outside of the centrifuge or into annular chamber 73 in which lubricant collects from the upper bearing 31, there is introduced through passage 71 a sealing gas, which is preferably an inert gas as, for instance, nitrogen, the desired qualities of the gas being that it will not react with the process gas and will not itself damage the centrifuge elements to which it is exposed or the lubricant. The sealing gas so introduced enters space 66 and a small amount escapes beyond ring 58 to chamber 73 and passes out with the lubricant drainage, while another small amount escapes past ring 59 and into annular space 65. At this place it commingles with whatever small amount of process gas escapes past ring 60, and the mixture of gases is withdrawn through passage 70. In order to bring about this flow of gas the pressure in passage 70 is maintained somewhat less than either that of the process gas in passage 54 or that of the sealing gas in passage 71. The mixture of gases taken from the centrifuge through passage 70 will usually be conducted to a trap where the two are separated and each may thereafter be reused.

The sealing means provided about the lower cylindrical portion of impeller 35 is similar to that just described. Inner sleeve or block members 74, 75, 76 and 77 are shrink fitted within sleeve 51, and between themselves or with sleeve 51 form a plurality of grooves into which extend flange portions 78 of the four sealing rings 80, 81, 82 and 83. As in the previous assembly described, spring rings 84 engage flanges 78 to yieldingly press them into slidable engagement with the surfaces of these respective grooves. Between sealing rings 80 and 81 there is a small annular space 86 into which sealing gas is introduced through a passage 87, and mixed process and sealing gas collects in annular space 88 between rings 81 and 82 and may be withdrawn through passage 89. The pressure in passage 89 is maintained as already explained for passage 70 to bring about the desired flow of sealing gas and process gas and the mixture of the two. The gas withdrawn from passage 89 is likewise led to a suitable separating means where the component gases may be recovered.

Between the forward and backward flow gas spaces 52 and 55 respectively there are provided a pair of small sleeves or blocks 91 and 92 shrink fitted in sleeve 50 at its lower end, and these cooperate with sealing rings 93 and 94 and spring rings 95 to effect a seal between the spaces. A space 98 between sealing rings 82 and 83 immediately below impeller 35 is connected to passage 97 which is also connected to the space between rings 93 and 94. The passage 97 leads outside of the centrifuge and may be connected either directly or through a pressure differential to the conduit leading from space 52 and passage 53. The pressure in spaces 96 and 98 is thus defined so that an unknown pressure will not be produced by the impeller 35 at the entrance to sealing member 82 and space 55.

The invention in its broader aspect is not limited to the specific mechanisms shown and described but departures may be made therefrom within the scope of the accompanying claims without departing from the principles of the invention and without sacrificing its chief advantages.

I claim:

1. Sealing means for a pair of relatively rotatable members having pairs of respectively intercommunicating fluid ports comprising, in combination, means defining a plurality of first spaces between said members at one side axially of said ports, means defining a second space between said members between two pairs of said ports, means for introducing fluid into one of said first spaces, means for withdrawing fluid from another of said first spaces closer to said ports, and means for withdrawing fluid from said second space.

2. Sealing means for a pair of relatively rotatable members having pairs of respectively intercommunicating fluid ports comprising, in combination, means defining a plurality of first spaces between said members at either side axially of two pairs of said ports, means defining a second space between said members between said pairs of said ports, means for introducing fluid into one of said first spaces at either side axially of said pairs of ports, means for withdrawing fluid from another of said first spaces at either side axially of said pairs of ports, said withdrawing spaces being closer to said pairs of ports than said introducing spaces, and means for withdrawing fluid from said second space.

3. Sealing means for a pair of relatively rotatable members having pairs of respectively intercommunicating fluid ports comprising, in combination, means defining a plurality of first spaces between said members at either side axially of two pairs of said ports, means defining a second space between said members between said pairs of said ports, means defining a third space at one side axially of said pairs of said ports, means for introducing fluid into one of said first spaces at either side of said pairs of said ports, means for withdrawing fluid from another of said first spaces at either side of said pairs of said ports, said withdrawing spaces being closer to said pairs of said ports than said introducing spaces, said third space being closer to said pairs of said ports than any said first space on its side axially of said pairs of ports, and common means for withdrawing fluid from said second and third spaces.

4. In a countercurrent centrifuge a hollow shaft, means dividing the interior of said shaft into a pair of fluid passages, a port in said shaft for each passage, a stationary member surrounding said shaft, a pair of fluid passages in said member each having a port adjacent a respective one of said first ports, a plurality of sealing members engaging said shaft and stationary member, said members being spaced apart to form a plurality of annular spaces on either side axially of said four ports and another space between said respective pairs of ports, and fluid passages in said stationary member communicating with each of said spaces, one of said passages having common communication with the space between said respective pairs of ports and a space adjacent one pair of said respective pairs of ports to one side axially of said ports.

References Cited in the file of this patent

UNITED STATES PATENTS

| | | |
|---|---|---|
| 1,188,189 | Little | June 20, 1916 |
| 2,107,035 | Hall | Feb. 1, 1938 |
| 2,187,147 | Englesson | Jan. 16, 1940 |
| 2,231,149 | Baum | Feb. 11, 1941 |
| 2,343,491 | Bard | Mar. 7, 1944 |